United States Patent
Marra et al.

(10) Patent No.: US 9,183,259 B1
(45) Date of Patent: Nov. 10, 2015

(54) SELECTING CONTENT BASED ON SOCIAL SIGNIFICANCE

(71) Applicants: Gregory M. Marra, San Francisco, CA (US); Jonathan Terleski, Mountain View, CA (US)

(72) Inventors: Gregory M. Marra, San Francisco, CA (US); Jonathan Terleski, Mountain View, CA (US)

(73) Assignee: Google Inc., Mountain View, CA (US)

( * ) Notice: Subject to any disclaimer, the term of this patent is extended or adjusted under 35 U.S.C. 154(b) by 124 days.

(21) Appl. No.: 13/740,125

(22) Filed: Jan. 11, 2013

Related U.S. Application Data

(60) Provisional application No. 61/586,364, filed on Jan. 13, 2012.

(51) Int. Cl.
 G06F 7/00 (2006.01)
 G06F 17/30 (2006.01)

(52) U.S. Cl.
 CPC .................................. G06F 17/3053 (2013.01)

(58) Field of Classification Search
 CPC .......... G06F 17/3053; G06F 17/30522; G06F 3/1243; G06F 17/3005
 See application file for complete search history.

(56) References Cited

U.S. PATENT DOCUMENTS

| | | | |
|---|---|---|---|
| 5,813,863 | A | 9/1998 | Sloane et al. |
| 5,978,928 | A | 11/1999 | Rust |
| 6,643,187 | B2 | 11/2003 | Mokhlesi |
| 7,539,632 | B1 | 5/2009 | Chakrabarti et al. |
| 7,822,631 | B1 | 10/2010 | Vander Mey et al. |
| 8,606,792 | B1 | 12/2013 | Jackson et al. |
| 9,043,313 | B2 | 5/2015 | Kumar |
| 2006/0294085 | A1 | 12/2006 | Rose et al. |
| 2008/0040475 | A1 | 2/2008 | Bosworth et al. |
| 2008/0059576 | A1 | 3/2008 | Liu et al. |
| 2009/0007167 | A1 | 1/2009 | Artom |
| 2009/0132520 | A1* | 5/2009 | Nemeth et al. ..................... 707/5 |
| 2009/0177588 | A1* | 7/2009 | Marchese ....................... 705/80 |
| 2009/0234945 | A1 | 9/2009 | Chande et al. |

(Continued)

FOREIGN PATENT DOCUMENTS

| | | |
|---|---|---|
| EP | 2568427 A1 | 3/2013 |
| WO | 2011064742 | 11/2009 |

OTHER PUBLICATIONS

Jon Duck-Schlossberg et al., "Battlefield Awareness and Data Dissemination Intelligent Information Dissemination Server," Final Technical Report, Air Forces Search Laboratory, Lockheed-Martin Corporation, Nov. 1999, 31 pages.

(Continued)

Primary Examiner — Azam Cheema
(74) Attorney, Agent, or Firm — Fish & Richardson P.C.

(57) ABSTRACT

Methods, systems, and apparatus, including computer programs encoded on a computer-readable storage medium, and including a method for displaying content. The method comprises receiving content items that are publishable to an activity stream in a social networking application for a user in a social network. The method further comprises evaluating the received content items using social criteria, including determining a social quality score for each content item. The method further comprises filtering the received content items to remove content items having social quality scores below a predetermined threshold. The method further comprises ranking remaining content items according to their associated social quality scores. The method further comprises publishing the remaining content items in the activity stream for the user in an order based at least in part on the ranking.

29 Claims, 8 Drawing Sheets

(56) References Cited

U.S. PATENT DOCUMENTS

| | | |
|---|---|---|
| 2009/0271391 A1 | 10/2009 | Kawale et al. |
| 2010/0036784 A1 | 2/2010 | Mishne et al. |
| 2010/0076850 A1* | 3/2010 | Parekh et al. ............... 705/14.66 |
| 2010/0100618 A1 | 4/2010 | Kuhlke et al. |
| 2010/0121849 A1 | 5/2010 | Goeldi |
| 2010/0228732 A1 | 9/2010 | Rhee et al. |
| 2010/0241580 A1 | 9/2010 | Schleier-Smith |
| 2010/0262658 A1 | 10/2010 | Mesnage |
| 2011/0022602 A1 | 1/2011 | Luo et al. |
| 2011/0040760 A1 | 2/2011 | Fleischman et al. |
| 2011/0041080 A1 | 2/2011 | Fleischman et al. |
| 2011/0154223 A1 | 6/2011 | Whitnah et al. |
| 2011/0191372 A1 | 8/2011 | Kaushansky et al. |
| 2011/0225170 A1 | 9/2011 | Obasanjo et al. |
| 2011/0231296 A1 | 9/2011 | Gross et al. |
| 2011/0246907 A1 | 10/2011 | Wang et al. |
| 2011/0302123 A1* | 12/2011 | Nista et al. ....................... 706/52 |
| 2011/0302152 A1* | 12/2011 | Boyd et al. ..................... 707/722 |
| 2011/0314098 A1 | 12/2011 | Farrell et al. |
| 2012/0005203 A1 | 1/2012 | Brzozowski et al. |
| 2012/0042386 A1 | 2/2012 | Backer |
| 2012/0158516 A1 | 6/2012 | Wooten et al. |
| 2012/0158753 A1 | 6/2012 | He et al. |
| 2012/0215903 A1 | 8/2012 | Fleischman et al. |
| 2012/0226701 A1 | 9/2012 | Singh |
| 2012/0284282 A9 | 11/2012 | Ghosh et al. |
| 2012/0330932 A1 | 12/2012 | Boyd et al. |
| 2013/0006882 A1 | 1/2013 | Galliani |
| 2013/0014031 A1 | 1/2013 | Whitnah et al. |
| 2013/0018896 A1 | 1/2013 | Fleischman et al. |
| 2013/0024757 A1 | 1/2013 | Doll et al. |
| 2013/0073983 A1 | 3/2013 | Rasmussen et al. |
| 2013/0204833 A1 | 8/2013 | Pang et al. |
| 2013/0218976 A1 | 8/2013 | Bosworth et al. |
| 2013/0246521 A1 | 9/2013 | Schacht et al. |
| 2013/0346497 A1 | 12/2013 | Hofmayer et al. |
| 2014/0013241 A1 | 1/2014 | Brown et al. |
| 2014/0298160 A1 | 10/2014 | Norwood et al. |

OTHER PUBLICATIONS

Lada A. Adamic et al., "Social network caught in the Web," First Monday, vol. 8, No. 6, Jun. 2, 2003, 22 pages.

Alice Emily Marwick, "Selling Your Self: Online Identity in the Age of a Commodified Internet," Thesis for degree of Master of Arts, University of Washington, 2005, 192 pages.

Thomas Erickson et al., "Social Translucence: Using Minimalist Visualizations of Social Activity to Support Collective Interaction," Designing Information Spaces: The Social Navigation Approach (eds. K. Höök, D. Benyon, A Munroe), Springer-Verlag: London, 2003, pp. 17-41.

Ronald van Eijk et al., "We-centric, context-aware, adaptive mobile service bundles," Telematica Instituut, Freeband Frux D1.1, Nov. 30, 2004, 48 pages.

Marc Steen et al., "Development of we-centric, context-aware, adaptive mobile services requires empathy and dialogue," Freeband Frux, 2005, 4 pages.

Tony Hammond et al., "Social Bookmarking Tools (I)," D-Lib Magazine, vol. 11, No. 4, Apr. 2005, 23 pages.

"How do I control what I see in my news feed?". Facebook [online] [Retrieved on Aug. 15, 2012]. Retrieved from the Internet: <URL: www.facebook.com>, 1 pg.

"How do I block or unblock someone?". Facebook [online]. [Retrieved on Aug. 15, 2012]. Retrieved from the Internet: <URL: http://m.facebook.com/help/126089290825165?refr=m-search>, 1 pg.

"Getting started with circles", Google+[online]. [Retrieved on Aug. 15, 2012]. Retrieved from the Internet: <URL: http://support.google.com/plus/bin/answer.py?hl=en&answer=1254208>, 1 pg.

* cited by examiner

US 9,183,259 B1

SELECTING CONTENT BASED ON SOCIAL SIGNIFICANCE

CROSS-REFERENCE TO RELATED APPLICATIONS

This application is a conversion of and claims priority to U.S. Application No. 61/586,364, filed provisionally on Jan. 13, 2012, the entire contents of which are hereby incorporated by reference.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

In general, one aspect of the subject matter described in this specification can be implemented in methods that include a method for displaying content. The method comprises receiving content items that are publishable to an activity stream in a social networking application for a user in a social network. The method further comprises evaluating the received content items using social criteria, including determining a social quality score for each content item. The method further comprises filtering the received content items to remove content items having social quality scores below a predetermined threshold. The method further comprises ranking remaining content items according to their associated social quality scores. The method further comprises publishing the remaining content items in the activity stream for the user in an order based at least in part on the ranking.

These and other implementations can each optionally include one or more of the following features. Publishing can include publishing the content items in an activity stream associated with the user. Evaluating the plurality of content items can include determining a social quality score for each of the content items and ranking the content items using the social quality scores for respective content items. Evaluating can further include filtering out ones of the plurality of content items based on the social criteria and not publishing the content items that are filtered out.

In general, another aspect of the subject matter described in this specification can be implemented in methods that include another method for displaying content. The method comprises identifying a plurality of content items for potential publication by a user in a social network. The method further comprises evaluating the plurality of content items including ranking the plurality of content items using social criteria. The method further comprises publishing one or more of the plurality of content items in an order in accordance with the ranking.

These and other implementations can each optionally include one or more of the following features. The social quality score can include a probability of a social engagement by a user in response to the content item being published and a social value of the social engagement, where the social value indicates expected interactions by the user in the social network that result from the published content item. Ranking can include promoting the rank of content items in proportion to their associated social quality scores. The social engagements can be selected from a group comprising: creating an edge in social graph, downloading an app, using an app, downloading a game, playing a game, or engaging with user content. Engaging with user content can be selected from a group comprising: tagging a photo, tagging a video, commenting on content, or republishing content. The probability of the social engagement can be an expected conversion rate that represents an expected global conversion rate for all users. The probability of the social engagement is an expected user conversion rate based on the user's past actions. The social value of the social engagement can be based on a point system that assigns different points for different types of social engagements. The social quality score can be a product of the probability of the social engagement and the social value of the social engagement. The probability of the social engagement can be determined based at least in part on information determined from observed behavior patterns for different users. The probability of the social engagement can be determined based at least in part on the user's location. The probability of the social engagement can be determined based at least in part on the user's language. The probability of the social engagement can be determined from user actions selected from a group comprising: commenting, promoting or messaging. The user action of promoting can be a social affinity action. Publishing the remaining content items can include using an auction that determines the order of the remaining content items based at least in part on social quality scores. The auction can further include using the display sizes of content items to rank a first content item with a smaller display size over a second content item with a larger display size. The received content items can include tip to the user. The received content items can include displayed promotions. The displayed promotions can be selected from a group comprising: promotions that describe new product features, encouragements to use existing product features, encouragements to download mobile apps, encouragements to visit content elsewhere on a site, or advertisements. Determining the social quality score can include determining a probability of the user performing an act that constitutes a conversion. The probability of the user performing the act can be determined using a function that includes a summation of individual probabilities associated with user actions. Publishing content items in the activity stream can further be based on machine learning. The machine learning can include processes for stopping publishing of a content item if less than a threshold number of users interact with the content item. The machine learning can include determining similarities based on previous actions by the other users and the ranking can include promoting the rank of a content item in proportion to a number of previous similar actions by the other users.

In general, another aspect of the subject matter described in this specification can be implemented in systems that include a content management system that provides content items. The content management system comprises a social quality score engine that evaluates content items using social criteria, including determining a social quality score for each content item, where the content items are publishable to an activity stream in a social networking application for a user in a social network. The content management system further comprises a filtering engine that filters content items to remove content items having social quality scores below a predetermined threshold. The content management system further comprises a ranking engine that ranks content items according to their associated social quality scores. The content management system further comprises a publishing engine that, in response to a request to publish content items in the activity stream for the user, publishes the remaining content items in the activity stream for the user in an order based at least on the ranking.

In general, another aspect of the subject matter described in this specification can be implemented in computer program products including a computer program product tangibly embodied in a computer-readable storage device and comprising instructions. The instructions, when executed by a processor, cause the processor to: receive content items that are publishable to an activity stream in a social networking application for a user in a social network; evaluate the received content items using social criteria, including determining a social quality score for each content item; filter the received content items to remove content items having social quality scores below a predetermined threshold; rank remaining content items according to their associated social quality scores; and publish the remaining content items in the activity stream for the user in an order based at least in part on the ranking.

In general, another aspect of the subject matter described in this specification can be implemented in computer program products including another computer program product tangibly embodied in a computer-readable storage device and comprising instructions. The instructions, when executed by a processor, cause the processor to: identify a plurality of content items for potential publication by a user in a social network; evaluate the plurality of content items including ranking the plurality of content items using social criteria; and publish one or more of the plurality of content items in an order in accordance with the ranking.

Particular implementations may realize none, one or more of the following advantages. For example, in user interfaces that have a fixed amount of space available to display content, content items that are displayed first can be selected based at least in part on social quality scores, e.g., to show the best content to the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
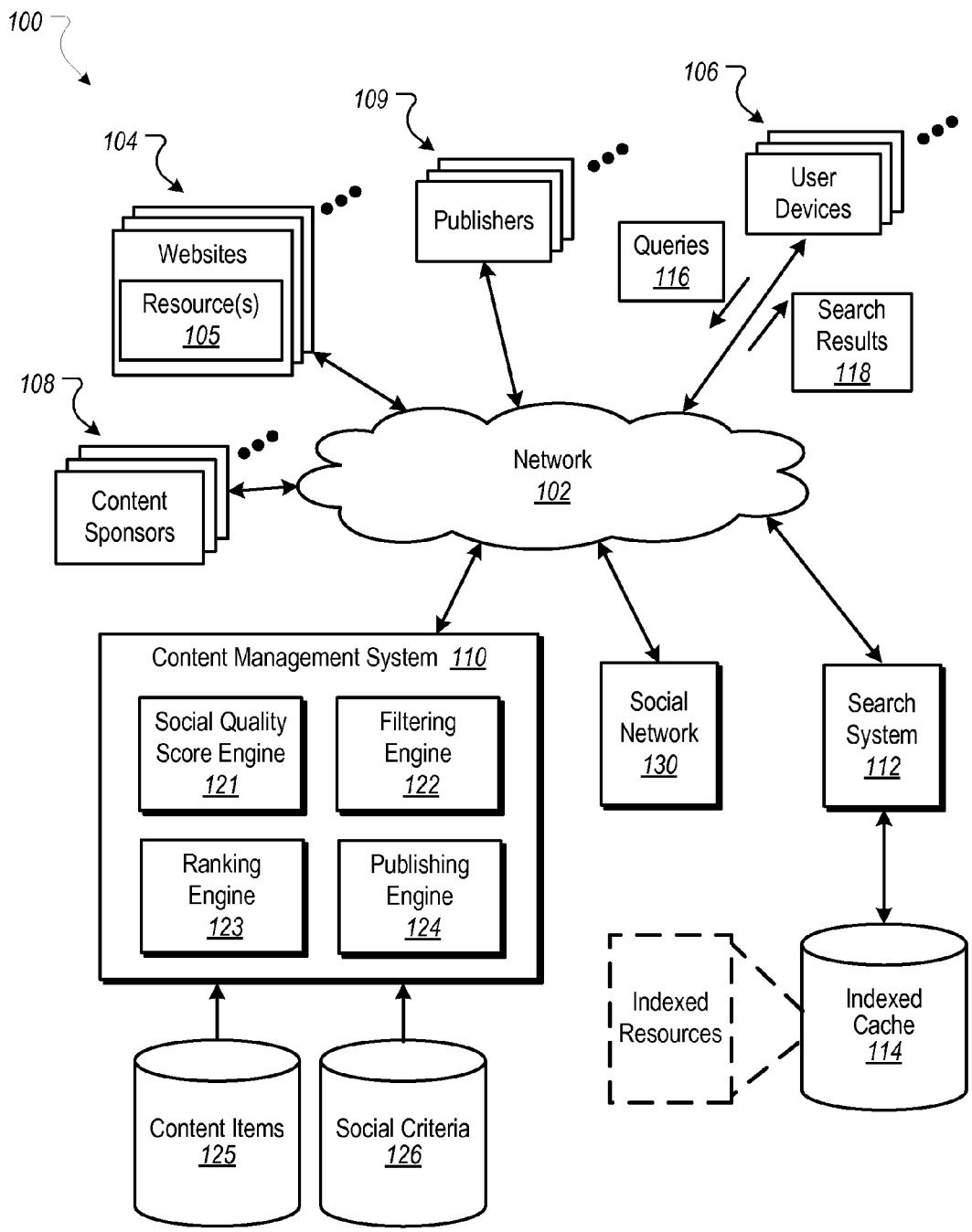
FIG. 1 is a block diagram of an example environment for delivering content.

This document describes methods, processes and systems for publishing content in a rank order that is based, at in least in part, on social quality scores of the content items. The social quality scores can indicate, for example, an overall social contribution or value that each content item has. Contribution or value in a social network can be measured, for example, based on a likelihood that the user will engage (along with how likely the user is to engage) with the content item. The social contribution, for example, can include the effects and/or social value to the social network if the user engages with a particular content item in a certain way (e.g., re-publishing the content item in the social network may be associated with a certain value). For example, the content items can be published in an activity stream in a social networking application for a user in a social network. By displaying the content items having the highest-ranked social quality scores first, the user can more quickly see the content items that may be of more interest to the user, in addition to potentially resulting in a higher social contribution.

Content items can include anything displayable in a social networking application or in a user's activity stream. The content items can include, for example, media, videos, comments, re-publications, tips to the user or displayed promotions, such as promotions that describe new product features, encouragements to use existing product or network features, encouragements to download apps, encouragements to visit content elsewhere on a site, or advertisements. Using social quality scores to rank the content items can maximize a user's experience by placing the "best" content items first.

In some implementations, an auction model can be used to determine content items to publish in an activity stream. For example, social posts and other content can be treated like advertisements, and user actions can be treated like an auction's click-throughs.

When a user interacts with a post, for example, different user actions may be associated with different values (i.e., in terms of the interactions' perceived social contribution). Example user actions include comments, social affinity actions (e.g., like, +1, heart, favorite, etc.), republications (or sharing), creating new social connections such as adding friends, and so on. In addition, some actions (e.g., comments) can trigger notifications to many users. For example, when a user comments on a post, all previous commenters can be notified, which can boost the social contribution associated with the user's comment (e.g., proportionally, based on the number of previously-commenting users).

In one example scenario, a set of content items that are eligible to be published in a first user's (e.g., user Andy's) activity stream can be evaluated using social criteria in order to determine a social quality score for each content item. For example, the social quality scores can indicate Andy's likelihood of engaging with the content if it is published. The social quality scores can be used to filter out content items that have a social quality score below a pre-determined threshold. The remaining content items can be ranked, based at least in part, according to their associated social quality scores and published in the rank order, e.g., in Andy's activity stream. In some implementations, ranking the content items can include promoting the rank of content items in proportion to their associated social quality scores. As a result, the content items that may be of most interest to Andy can be published and displayed first, and some content items, e.g., of lesser interest to Andy, may not be published at all.

In some implementations, an auction can be used in publication of the content items. For example, the auction can be used to determine the order of the remaining (e.g., after filtering) content items based at least in part on social quality scores. In some implementations, the auction can consider the display size of content items when ranking content items for selection. As an example, a first content item with a smaller display size can be ranked above a second content item with a larger display size. This can occur, for example, when two smaller content items whose display sizes sum to a larger content item's display size have social quality scores (e.g., 16 and 18) that, when summed, meet or exceed the social quality score (e.g., 30) of the larger content item. As a result, more efficient use of space (e.g., vertical space and/or area in an activity stream) can result.

Social quality scores can include and/or be based on different factors. For example, social quality scores can include a probability of a social engagement by a user in response to the content item being published. The probability, for example, can represent a likelihood that the user will engage with the content in one or more particular ways. In some implementations, the probability of the social engagement can be an expected conversion rate that represents an expected global (e.g., average) conversion rate for all users. In some implementations, user-specific information can be used for the probability of social engagement. For example, the probability of a social engagement by a first user (our user Andy) can be an expected conversion rate based on the user's (e.g., Andy's) past actions, e.g., whether and how frequently Andy has previously engaged with the same content item and/or similar content items.

In some implementations, observed behavior patterns can influence probabilities. As an example, the probability of the social engagement can be determined based at least in part on information determined from past behavior patterns for different users. For example, if past experience shows that P percent of users are known to download an app when presented with the option (e.g., as a clickable link in a content item), then that percentage P can be used to represent and/or contribute to the probability of the social engagement.

In some implementations, user location information can be used in determining the probability of the social engagement. For example, based on historical information, users in a first location (e.g., San Francisco) can have a higher probability of engaging with health food-related content than users in a second location (e.g., Death Valley). In another example, users in a first location (e.g., San Francisco) may be more likely to engage with content that names and/or is related to content associated with the location. Location information can be determined, for example, from a known city or address location of a user (e.g., through user-supplied profile information) or from a current global positioning system (GPS) location of the user that may be determined, for example, from the user's mobile device (e.g., if the user opts in to location-based information).

In some implementations, language information can be indicative of how a user may engage with content. For example, the probability of the social engagement can be determined based at least in part on the user's language. Some content items, for example, can have different probabilities of social engagement depending on whether the user's primary language is English, Spanish, French, or some other language.

Various user actions can be used in determining the probability of social engagement. For example, there may be several different types of user actions that can be predicted to occur in response to a published content item. In some implementations, different probabilities can be determined based on whether the likely user action is commenting, promoting (e.g., social affinity actions such as like, +1, heart, favorite, etc.), messaging (e.g., messaging a friend), or messaging a new person.

Social quality scores can further be based on a social value of the social engagement, e.g., indicating one or more expected interactions by the user in the social network that are likely to result from the published content item. Some example social engagements include: creating an edge in social graph, downloading an app, using an app, downloading a game, playing a game, or engaging with user content. Some examples of engaging with user content include: tagging a photo, tagging a video, commenting on content, or republishing content. Examples of creating an edge in a social graph include becoming a friend, joining a group, subscribing, following, and so on.

In some implementations, social quality scores can be determined using one or more probabilities. An example probability that can be used includes an expected click-through rate (CTR), e.g., a mathematical product of a value of the conversion (or engagement) multiplied by an expected conversion probability. In some implementations, the expected CTR and/or other expected conversion probabilities can be based globally on several users and/or based on users' past actions. In some implementations, probabilities can represent or include global conversion rates based on inferences from users with similar demographic or psychographic traits, e.g., using information on age, gender, language, location, income and the use of specific products.

Different social engagements can be assigned different social values. In some implementations, the social value of the social engagement can be based on a point system that assigns different points for different types of social engagements. For example, the social engagement of downloading an app may be assigned 50 points, while just playing the app may be assigned 20 points. In some implementations, assigned and/or computed points can be used in determining a social quality score. For example, the social quality score can be a product of the probability of the social engagement and the social value of the social engagement. As a result, the social quality score that is determined includes the probability of the user performing a social engagement (e.g., an act that constitutes a conversion) and the social value of that engagement. In some implementations, the probability can be calculated using a function that includes a summation of individual probabilities associated with user actions.

In some implementations, machine learning techniques can be used in association with publishing content items in an activity stream. For example, the machine learning techniques can include processes for stopping publishing of a content item if less than a threshold number of users interact with the content item. In some implementations, the machine learning techniques can determine similarities based on previous actions (e.g., posts, republishing, engagements, etc.) by other users. In some implementations, when content items are ranked by social quality scores, the rank of a content item can be promoted in proportion to a number of previous similar actions by the other users.

FIG. 1 is a block diagram of an example environment 100 for delivering content. The example environment 100 includes a content management system 110 for selecting and providing content in response to requests for content and at least one user network, e.g. social network 130. The example environment 100 includes a network 102, such as a local area network (LAN), a wide area network (WAN), the Internet, or a combination thereof. The network 102 connects websites 104, user devices 106, content sponsors 108 (e.g., advertisers), content publishers 109, the social network 130, and the content management system 110. The example environment 100 may include many thousands of websites 104, user devices 106, content sponsors 108 and content publishers 109.

In some implementations, the example environment 100 further includes plural engines. A social quality score engine 121 can evaluate content items using social criteria, including determining a social quality score for each content item, where the content items are publishable to an activity stream in a social networking application for a user in a social network. A filtering engine 122 can filter the content items to remove any content items that have social quality scores below a predetermined threshold. A ranking engine 123 can rank the remaining (e.g., post-filtered) content items according to their associated social quality scores. A publishing engine 124 can, in response to a request to publish content items in the activity stream for the user, provide the remaining ranked content items for publication in the activity stream, where the content items are published in an order based at least on the ranking.

In some implementations, the environment 100 includes plural data stores. For example, a data store of content items 125 can store content items that include advertisements and/or other content items in campaigns created by content sponsors 108. The content items 125 can also include content generated by social network applications and/or content that has been re-published by users in the social network 130. In some implementations, content items 125 can include promotions, tips, advertisements, search results, blog posts, restaurant listings, etc.

Tips can correspond, for example, to whether a user has completed task. One example tip can be related to performing steps to import email contacts, such as for a socially-related mobile app that the user just downloaded.

A data store of social criteria 126 can include the criteria used to evaluate content items to determine their social quality scores. For example, the social criteria 126 can include information and techniques for measuring and determining probabilities associated with engagements that users have had with previously-presented content items and/or that users may have with content items that may be presented in the future. The social criteria 126 can be used to determine a probability of engagement from various information including, for example, a user's past conversion rate for a particular content item (e.g., an advertisement, promotion, user published content or other forms of content), the number of times the user has seen the content item without engaging, the use and/or ownership by the user of other products in the same suite or group as the promoted product, etc. Other social engagements that correspond to social criteria 126 include, for example, requests to add another user as friend (e.g., an edge in a social graph), tagging a user in a photo or video, commenting on a user's status, expressing "Happy Birthday" on a user's birthday, visiting a user's profile (e.g., with or without a referral from a search engine using the user's name as a keyword), searching on a user's name within the social network site, re-publishing a user's content (e.g., links, photos, videos, or other content), determining that a user was sent a non-spam message (e.g., in a chat, wall post, email, etc.), and so on.

In some implementations, the content management system 110 includes a request handler that can receive a request for content from a user, identify one or more eligible content items 125, and provide the content items responsive to the request. The content management system 110 can also provide content items in the form of entries in a user's activity stream, where the entries are generated, for example, by social networking applications associated with the social network 130. The content items from either source can be published in a user's activity stream. As is discussed herein, the eligible content items can be filtered and ranked by social quality scores before publication.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation) and social quality scores.

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads that have characteristics matching the characteristics of ad slots and that are identified as relevant to specified resource keywords or search queries 116.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable/observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved in various ways. For example, social quality scores can be used to select and/or prioritize (e.g., by ranking) content to be published. As a result, content items (e.g., ads) that are published can be selected based at least in part on how likely the user is to react positively to a content item, e.g., leading to a conversion or some other social engagement such as commenting, promoting, messaging or the like.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 2A:
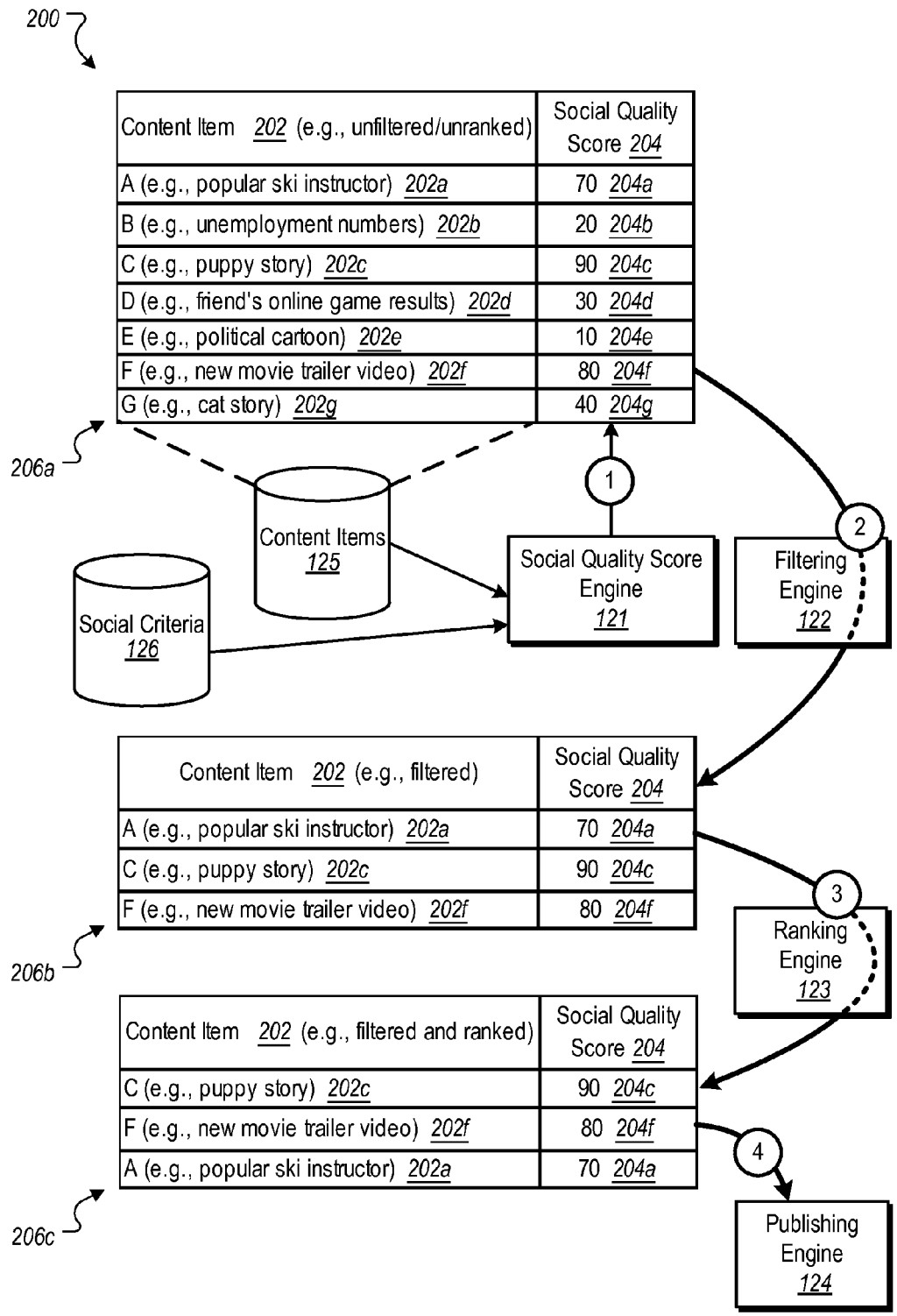
FIG. 2A is a block diagram of an example system for publishing content items ranked by social quality scores.

FIG. 2A is a block diagram of an example system 200 for publishing content items ranked by social quality scores. For example, the system 200 can be used to publish content items in a user's activity stream in descending order by social quality score, where the content item(s) that have the greatest social significance appear first or at the top of the activity stream. The activity stream, for example, can be included in a social networking application for a user in a social network. The system 200 can be implemented at least in part by the content management system 110 described with reference to FIG. 1. By way of illustration and using the example shown in FIG. 2A, publishing the content items ranked by social quality can occur using five stages, as will be described. In some implementations, other stages and/or sequences can be used in order to produce the same result.

In some implementations, a social quality score engine 121 can evaluate content items 202 using social criteria 126 (stage 1). The content items 202 that are selected, for example, from the content items 125, may be eligible content items that are retrieved for presentation in a user's (e.g., the user Andy's) activity stream. Example content items A-G $202a$-$202g$ can include a story about Andy's favorite ski instructor, a content item about unemployment numbers, a puppy story, a friend's online game results, a political cartoon, a new movie trailer video, and a cat story. These are a few examples of many different types of content items that can be selected to appear in a user's activity stream. This order of content items A-G $202a$-$202g$ can be, for example, a random order in which the content items were retrieved from various sources, or an order that initially places the most recent content items first. Sources for the content items 125 can include, for example, postings (e.g., stories, photos, videos) by other users (e.g., Andy or his friends), game results, content received based on a subscription (e.g., because of who Andy follows), social updates, online sources to which Andy subscribes, and so on.

The social quality score engine 121 can determine social quality scores $204a$-$204g$ for each of the content items A-G $202a$-$202g$, respectively, as shown in table $206a$ (stage 2). The social quality scores 204 in this example range from 10 to 90, e.g., as a sample of scores within a scoring system that produces quality scores between 1 and 100. Other scoring ranges and techniques can be used, as long as the scores produced represent relative social qualities of the content items.

For example, the social quality score engine 121 may determine a social quality score $204a$ of 70 for the content item A $202a$, determining a relatively high score because ski instructor photos are popular. A higher yet social score $204c$ of 90 can be determined for the puppy story content item C $202c$. The social quality score engine 121 may also determine lower scores, such as a relatively low social quality score $204d$ of 30 for the content item D $202d$ related to Andy's friend's online game results. An extremely low social quality score $204e$ of 10 can be determined for the political cartoon content item E $202e$.

Once the social quality scores 204 are determined for the content items 202, the filtering engine 122 can filter the content items 202 to remove content items that have social quality scores 204 below a predetermined threshold. For example, if the predetermined threshold is 50, then the filtering engine 122 can eliminate content items B $202b$, D$202d$, E $202e$ and G $202g$ that have social quality scores $204b$, $204d$, $204e$ and $204g$, respectively (e.g., all less than 50). Other thresholds can be used, as well as other deterministic techniques for eliminating content items that have social quality scores below a predefined score. Table $206b$ shows sample content items that survive the filtering performed by the filtering engine 122, namely content items A $202a$, C $202c$ and F $202f$ that have social quality scores of 70, 90 and 80, respectively. For example, as a result of the filtering, three content items 202 are retained, e.g., related to Andy's favorite ski instructor, the puppy story, and the new movie trailer video.

After the content items 202 have been filtered using the social quality scores 204, the ranking engine 123 can rank content items 202 according to their associated social quality scores 204 (stage 3). For example, as shown in table $206c$, the highest-ranked content item 202 can be content item C $202c$ (e.g., the puppy story) which has the associated social quality score $204c$ of 90. In this example, the rank of the content item C $202c$ can be promoted in proportion to the content item's associated social quality score. The remainder of the content items F $202f$ and A $202a$ that have associated social quality scores $204f$ and $204a$ of 80 and 70, respectively, occupy the rest of table $206c$. As a result of the ranking, the content items 202 that remain from the original seven content items 202 in table $206a$ are ranked in descending order by social quality score 204.

Once the content items 202 are filtered and sorted, the publishing engine 124 can publish the content items 202 (stage 4). For example, publication can occur in response to a request to publish content items in the activity stream for the user. The content items 202 that are published, for example, can be the content items that remain after filtering by the filtering engine 122. Further, the content items 202 can be published in an order based at least on the ranking. In some implementations, the order in which the content items are published can depend on other factors, e.g., the relative newness of the content item. For example, unless the order is changed based on factors such as social quality scores, newer content items can be published at the top of a user's activity stream.

Figure 2B:
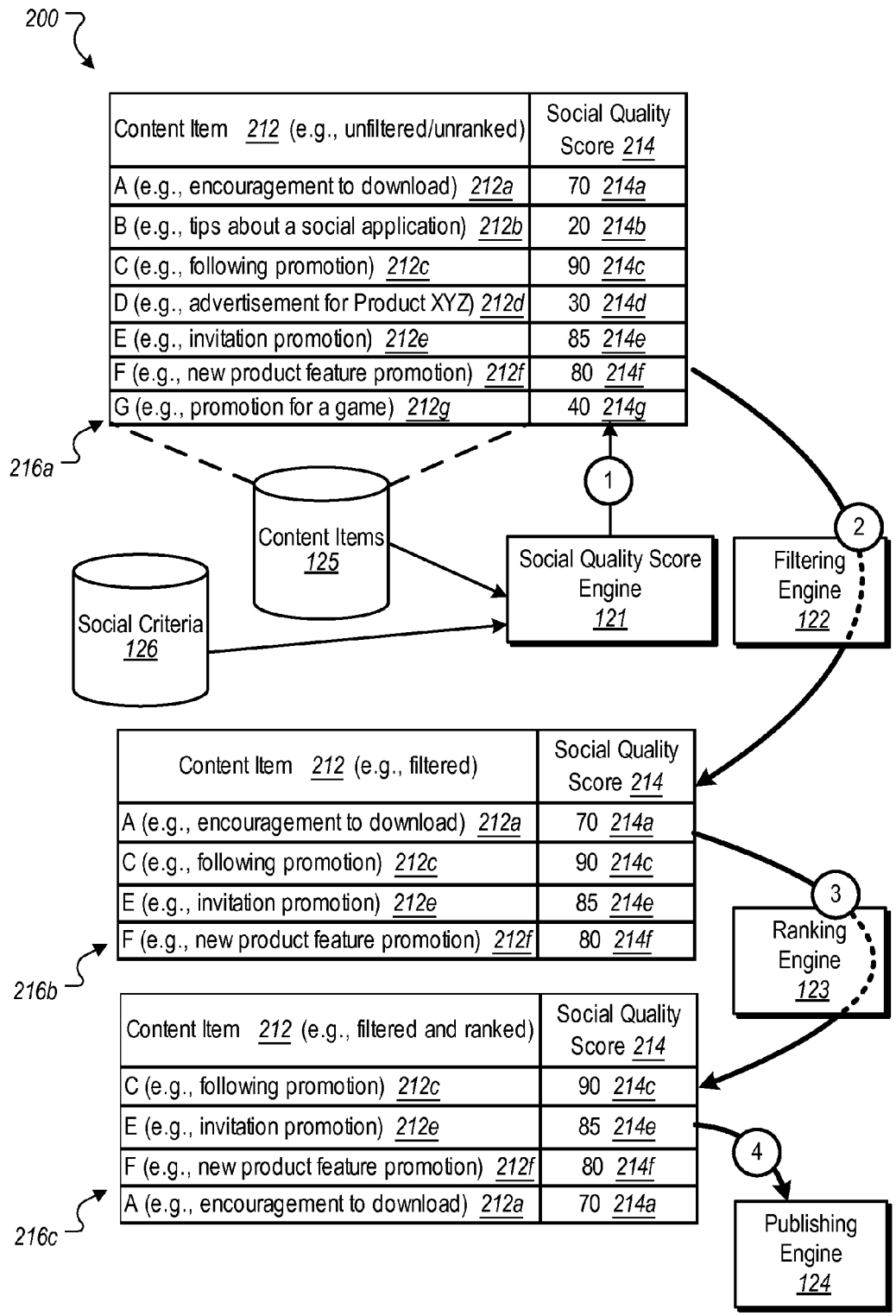
FIG. 2B is a block diagram of the example system showing a different set of content items ranked by social quality scores.

FIG. 2B is a block diagram of the example system 200 showing a different set of content items ranked by social quality scores. However, content items 212 in this example are different from the content items 202 described with reference to FIG. 2A. This example can use the same stages 1-5 as described with reference to FIG. 2A for obtaining, evaluating filtering, ranking and publishing content items.

In this example, the content items 212 include content items A $212a$ (e.g., an encouragement to download an app), B $212b$ (e.g., tips about a social app), C $212c$ (e.g., a following promotion), D $212d$ (e.g., an advertisement for Product XYZ), E $212e$ (e.g., an invitation promotion), F $212f$ (e.g., a new product feature promotion), and G $212g$ (e.g., a game promotion). Similarly as above for the example described with reference to FIG. 2A, the social quality score engine 121 can evaluate content items 212 using social criteria 126 to determine social quality scores $214a$-$214g$, respectively, as shown in table $216a$.

Once the social quality scores 214 are determined for the content items 212, the filtering engine 122 can filter the content items 212 to remove content items that have social quality scores 214 below a predetermined threshold. For example, if the predetermined threshold is 50, the filtering engine 122 can eliminate content items $212b$, $212d$ and $212g$ that have social quality scores $214b$, $214d$ and $214g$, respectively (e.g., all less than 50). Table $216b$ shows sample content items that survive the filtering, namely content items $212a$, $212c$, $212e$ and $212f$ that have social quality scores of 70, 90, 85 and 80, respectively.

After the content items 212 have been filtered using the social quality scores 214, the ranking engine 123 can rank content items 212 according to their associated social quality scores 214. For example, as shown in table $216c$, the highest-ranked content item 212 can be content item C $212c$ which has the associated social quality score $214c$ of 90. In this example, the rank of the content item C $212c$ can be promoted in proportion to the content item's associated social quality score. The remainder of the content items E $212e$, F $212f$ and A $212a$ that have associated social quality scores $214e$, $214f$ and $214a$ of 80, 85 and 70, respectively, occupy the rest of table $216c$. As a result of the ranking, the content items 212 that remain from the original seven content items 212 in table $216a$ are ordered in descending order by social quality score 214.

Once the content items 212 are filtered and sorted, the publishing engine 124 can publish the content items 212, e.g., in response to a request to publish content items for the user. The content items 212 that are published, for example, can be the content items that remain after filtering by the filtering engine 122. Further, the content items 212 can be published in an order based at least on the ranking. In some implementations, the content item 212 can be published in the same or a different place as the content items 202. For example, while content items 202 may be published in an activity stream (e.g., in a large, center area of a social networking user interface), the content items 212 can be published in an area reserved primarily for promotions, advertisements and other content (e.g., to the right of an activity stream).

Figure 2C:
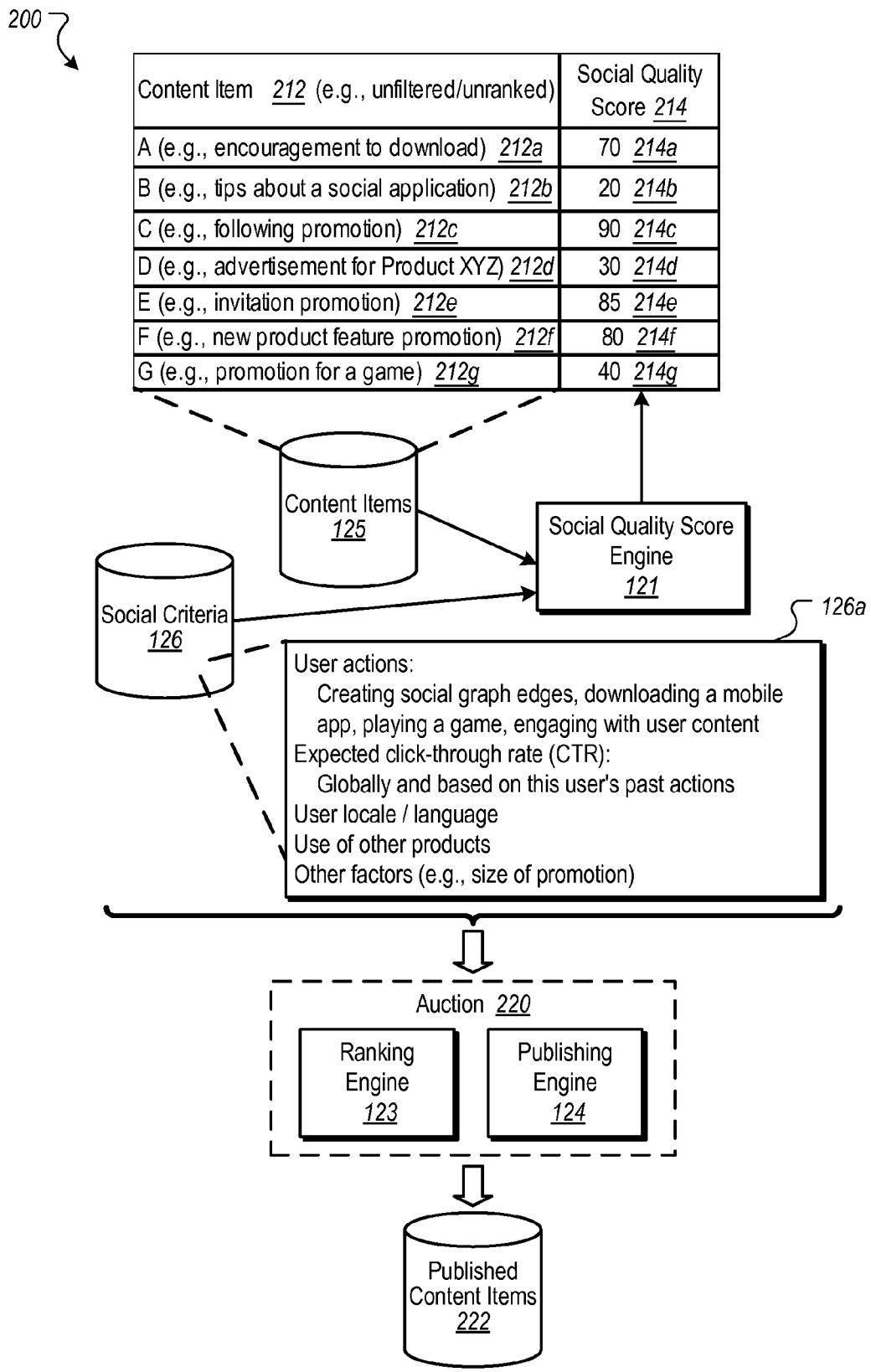
FIG. 2C is a block diagram of the example system for conducting an example auction that uses the social quality scores.

FIG. 2C is a block diagram of the example system 200 for conducting an example auction 220 that uses the social quality scores. For example, the auction 220 can be analogous to advertisement auctions (e.g., based on monetary measures), but instead consider, for example, the expected contribution of content items to the social environment or social ecosystem. Promotions, for example, may tell users about new features, encourage them to use existing features, encourage them to download a mobile app, encourage them to visit content elsewhere on a site, display advertisements, and so on.

In some implementations, the auction 220 can select which content items to display to the user, e.g., as published content items 222. For example, selection of content items can depend on social criteria 126a which can include, for example, information about user actions that occur on social networking sites and expected interaction rates (e.g., click-through rates (CTRs), forwarding action rates, or affinity designation rates). Various user actions can have different values, where each value represents an expected contribution of the content item to the social environment or social ecosystem. Moreover, each content item can have an expected interaction rate (e.g., CTR) based on a user's past actions.

In some implementations, the auction 220 can rely on determined social quality scores (e.g., to determine which content items are "best") using, for example, a product of the value of a conversion and a probability of an expected conversion:

$$\text{Social Quality Score} = (\text{Value of Conversion} * \text{Expected Conversion}) \quad (1)$$

The social quality score and bid for a given content item can then be used to rank a given content item in the auction 220. In some implementations, the value of a conversion (e.g., "Value of Conversion" in formula 1) can vary by the type of user action. As examples, installing a mobile app may be worth (e.g., have a value of) fifty points, adding a social graph edge may be worth five points, and viewing a friend's photograph may be worth one point.

In some implementations, expected conversion data (e.g., "Expected Conversion" in formula 1) can have several inputs. For example, an expected conversion can be based, at least in part, on a historical global conversion rate for the content item. In some implementations, the expected conversion can be based, at least in part, on a user's past conversion rate for the content item (e.g., how many times has the user seen this content item without engaging?). Other factors that can be used to determine a social quality score include, for example, the user's locale, the user's language, and the user's experience (e.g., ownership, use of content, sharing of content, etc.) with products that are related to the content item.

In some implementations, social quality scores can also be based on tasks associated with a user. For example, if a content item is associated with a mobile application that can be used to interact with others, then the social quality score can be based, at least in part, on associated completed and/or pending user tasks (e.g., whether the user has obtained the application, or whether the user has imported contacts).

In another example, consider a slot that can accommodate either a single larger content item (e.g., advertisement) or two smaller content items. As an example, the larger content item may have a social quality score of 25.3, and the smaller content items may have social quality scores of 18.1 and 9.2, respectively. Because the sum (e.g., 27.3) of social quality scores of the smaller content items is greater than the social quality score (e.g., 25.3) of the larger content item, the auction 220, for example, can select the two smaller content items to be published content items 222.

Figure 3A:
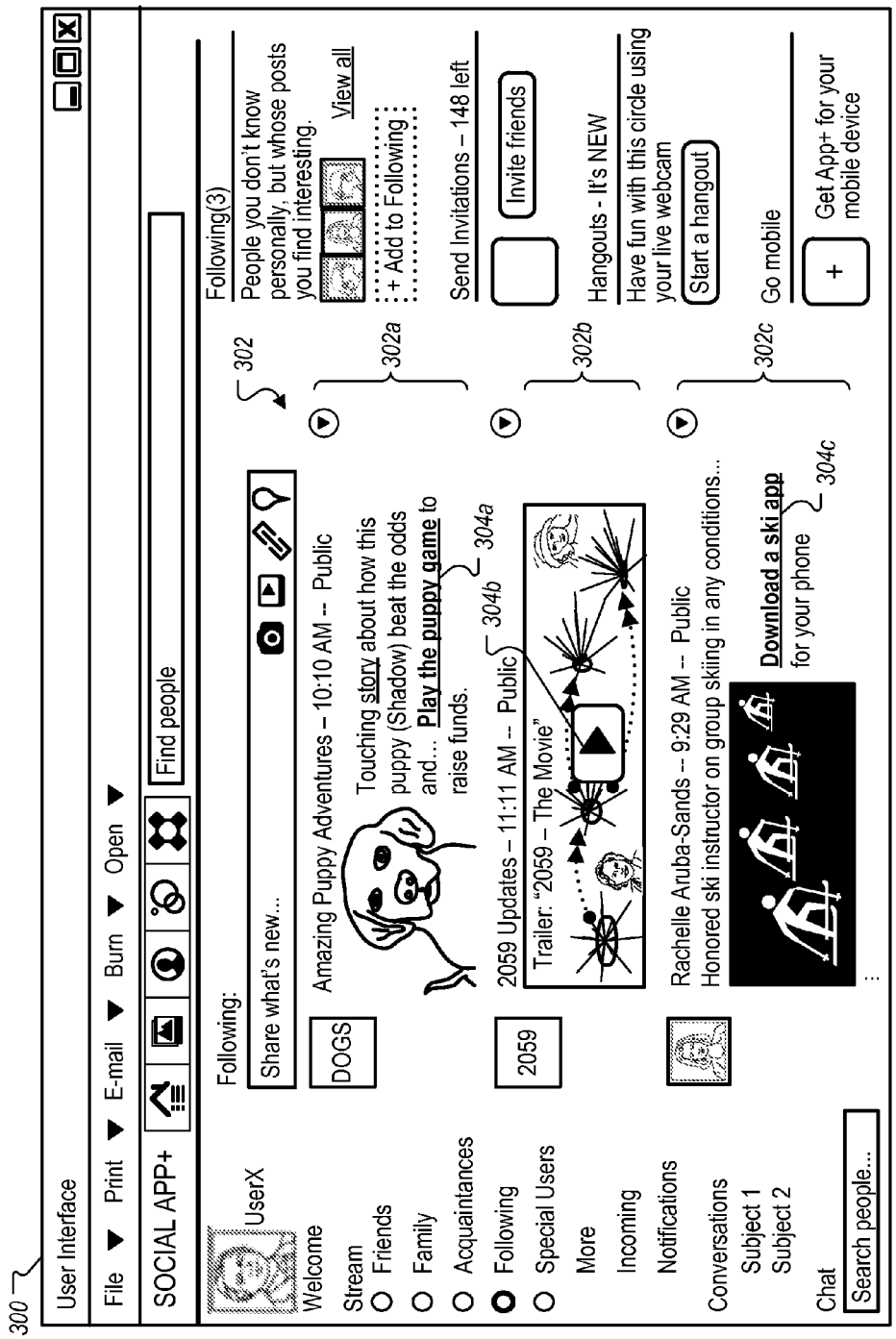
FIG. 3A shows an example user interface in which published content items are ranked by social quality score.

FIG. 3A shows an example user interface 300 in which published content items 302 are ranked by social quality score. In some implementations, the presentation order of the content items 302 can be determined by the system 200, as described with reference to FIG. 2A. The user interface 300 can be, for example, a social networking web page or some other interface that can present content items that have social aspects. For example, the portion of the user interface 300 in which the content items 302 appear can be an activity stream, a news feed, or some other socially-related content area of a user interface of any device 106. While the page layout of the user interface 300 suggests a non-mobile application (e.g., on a non-mobile computing device), content items 302 can also be presented in ranked order in user interfaces for mobile devices in which the layout of information on the screen is formatted to fit a smaller viewport. Filtering and ranking content items using social quality scores can be especially useful for presenting the "best" information to users with mobile devices. This is because mobile devices generally have smaller viewports and display less information at once as compared to non-mobile devices.

Continuing with the example introduced in FIG. 2A, the content items 302 are presented in the order shown in table 206c, i.e., ranked by social quality scores 204. For example, the content item 302a, the first entry in the content items 302, corresponds to content item C 202c (e.g., the puppy story) which is the first entry in table 206c. Similarly, secondly- and thirdly-displayed content items 302b and 302c correspond to content items F 202f and A 202a in table 206c. Thus, content items 302b (e.g., about the new movie trailer video) and 302c (about Andy's favorite ski instructor) that have associated social quality scores of 80 and 70, respectively, are displayed below content item 302a that has an associated social quality score of 90.

In some implementations, a content item may be ranked higher and thus displayed at or near the top of a user's activity stream if the content item includes one or more controls and/or features that increase the likelihood that the user will engage with the content item. For example, the content item 302a shown in FIG. 3A includes a user-selectable control 304a for playing a game related to puppies. Similarly, the content item 302b includes a user-selectable control 304b for playing a movie trailer video, and the content item 302c includes a user-selectable control 304c for downloading an application related to skiing.

Figure 3B:
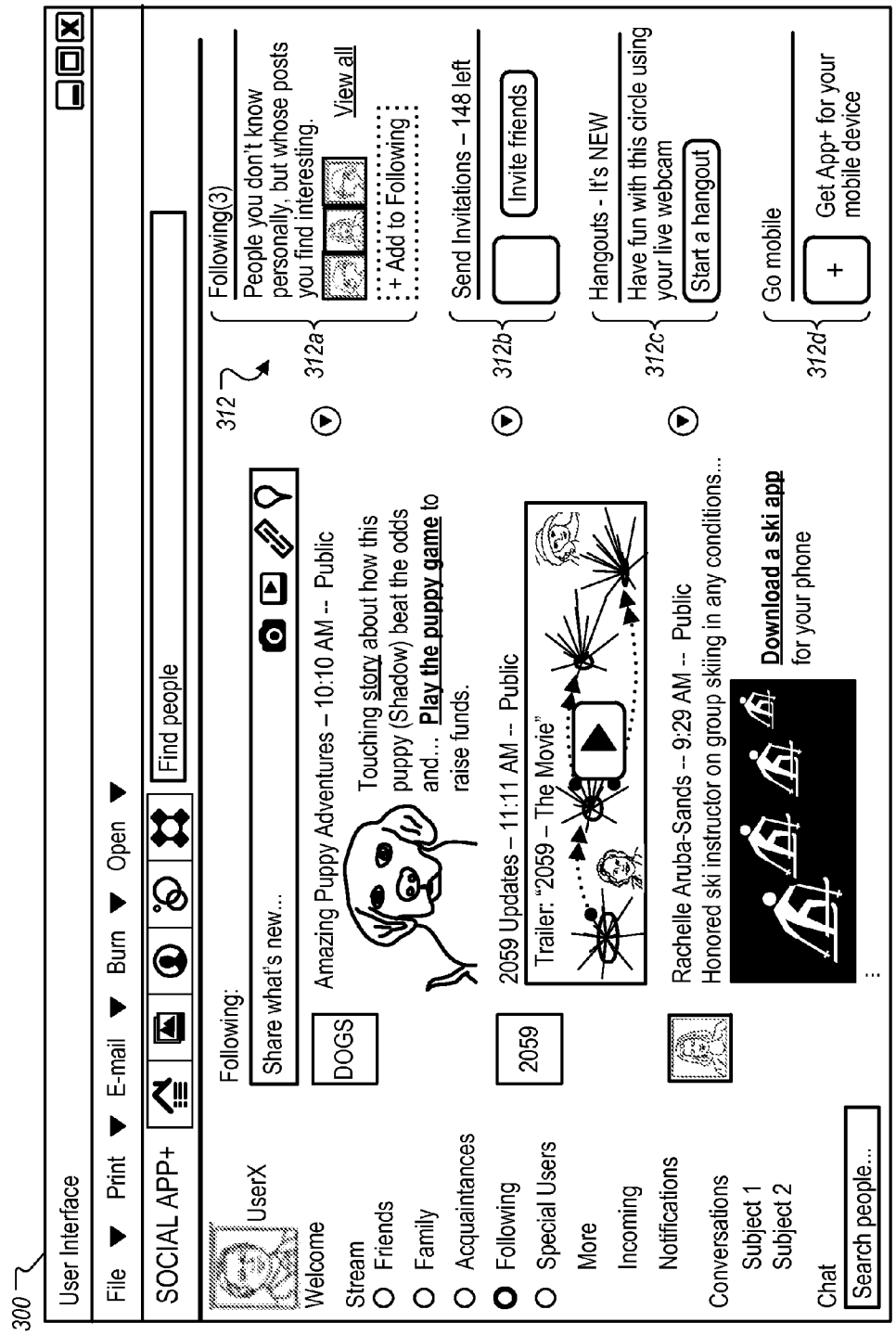
FIG. 3B shows the example user interface in which other content items are ranked by social quality score.

FIG. 3B shows the example user interface 300 in which other content items 312 are ranked by social quality scores. In some implementations, the presentation order of the content items 312 can be determined by the system 200, as described with reference to FIG. 2B.

Continuing with the example introduced in FIG. 2B, the content items 312 are presented in the order shown in table 216c, i.e., ranked by social quality scores 214. For example, the content item 312a, the first entry in the content items 312, corresponds to content item C 212c, which is the first entry in table 216c. Similarly, the remaining content items 312b-312d correspond to content items E 212e, F 212f and A 212a in table 216c.

Figure 4:
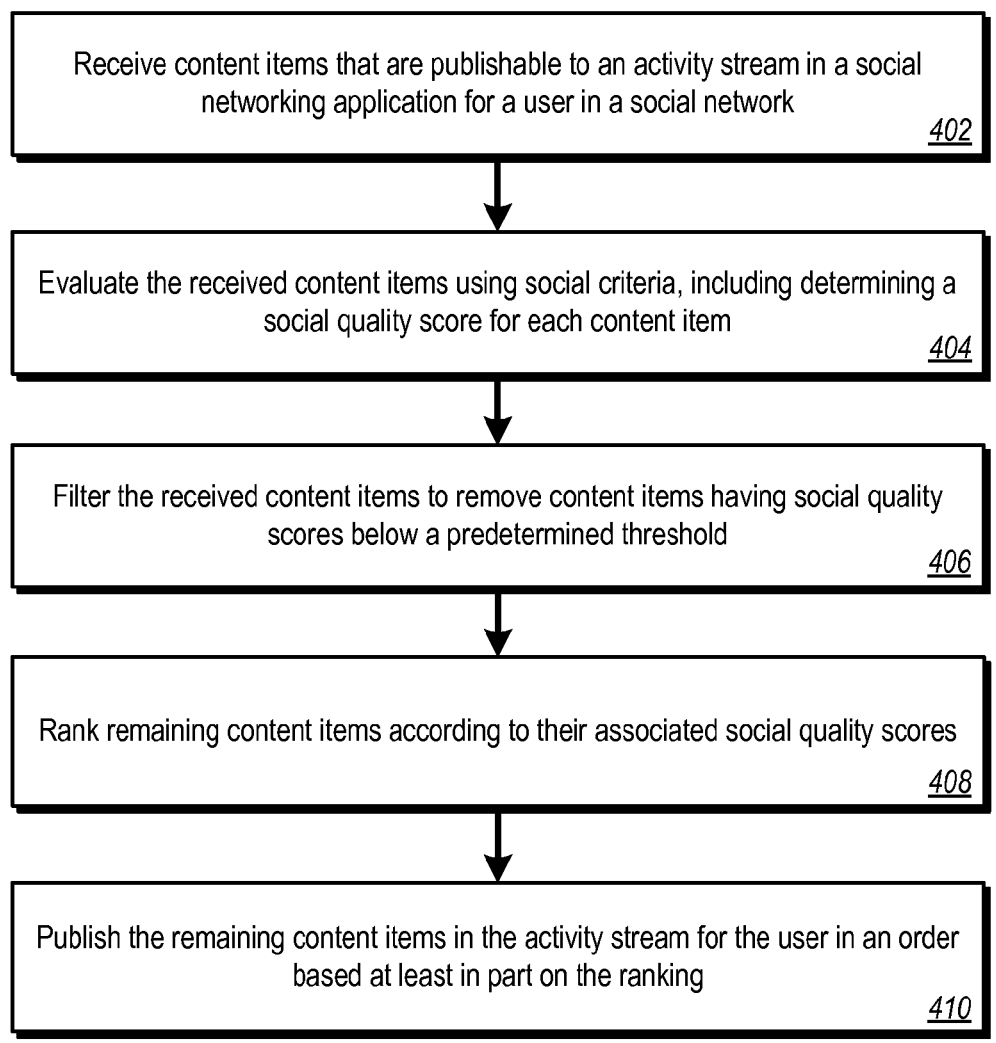
FIG. 4 is a flowchart of an example process for publishing content items that are ranked, based at least in part, on social quality scores.

FIG. 4 is a flowchart of an example process 400 for publishing content items that are ranked, at least in part, based on social quality scores. For example, the content items can be published in the activity stream for a user in the social network 130. In some implementations, some or all of the steps of the process 400 can be performed by the social quality score engine 121, the filtering engine 122, the ranking engine 123 and the publishing engine 124. FIGS. 2A and 3A are used to provide examples for steps of the process 400.

Content items are received that are publishable to an activity stream in a social networking application for a user in a social network (402). For example, content items 202a-202g, listed in table 206a, can be content items that are identified as being publishable to the activity stream of a user named Andy.

The received content items are evaluated using social criteria, including determining a social quality score for each content item (404). As an example, the social quality score engine 121 can evaluate the content items A-G 202a-202g using social criteria 126 to determine social quality scores A-G 204a-204g that correspond to the content items A-G 202a-202g.

The received content items are filtered to remove content items that have social quality scores below a predetermined threshold (406). The filtering engine 122, for example, can filter the content items 202 to remove content items that have social quality scores below a predetermined threshold (e.g., 50). For example, the content items that are filtered and removed by the filtering engine 122 can include content items B 202b, D 202d, E 202e and G 202g, all of which have social quality scores that are under the threshold 50. Table 206b lists the content items (e.g., content items A 202a, C 202c and F 202f) that remain after the filtering.

The remaining content items are ranked according to their associated social quality scores (408). The ranking engine 123, for example, can rank the content items 202a, 202c and 202f according to their associated social quality scores 204a, 204c and 204f (e.g., scores of 70, 90 and 80, respectively). As a result, the ranked order of the content items can be content items 202c, 202f and 202a, e.g., in descending order by social quality scores (e.g., 90, 80 and 70).

The content items are published in the activity stream for the user in an order based at least in part on the ranking (410). As an example, publishing engine 124, in response to a request to publish content items in Andy's activity stream for the user, can publish the remaining content items in Andy's activity stream. Further, the content items can be presented in descending order, e.g., ranked based on the likelihood that Andy will engage with the content items in some way.

In some implementations, other processes can be used to publish content items ranked by social quality scores. For example, a plurality of content items can be identified for potential publication by a user in a social network. The content items can be evaluated, including ranking the content items using social criteria. In some implementations, the evaluation can include determining a social quality score for each of the content items and ranking the content items using the social quality scores for respective content items. The content items can be published in an order in accordance with the ranking. In some implementations, publication can occur in an activity stream associated with the user. In some implementations, publication can exclude publication of content items that are filtered out, e.g., during the evaluation process.

Figure 5:
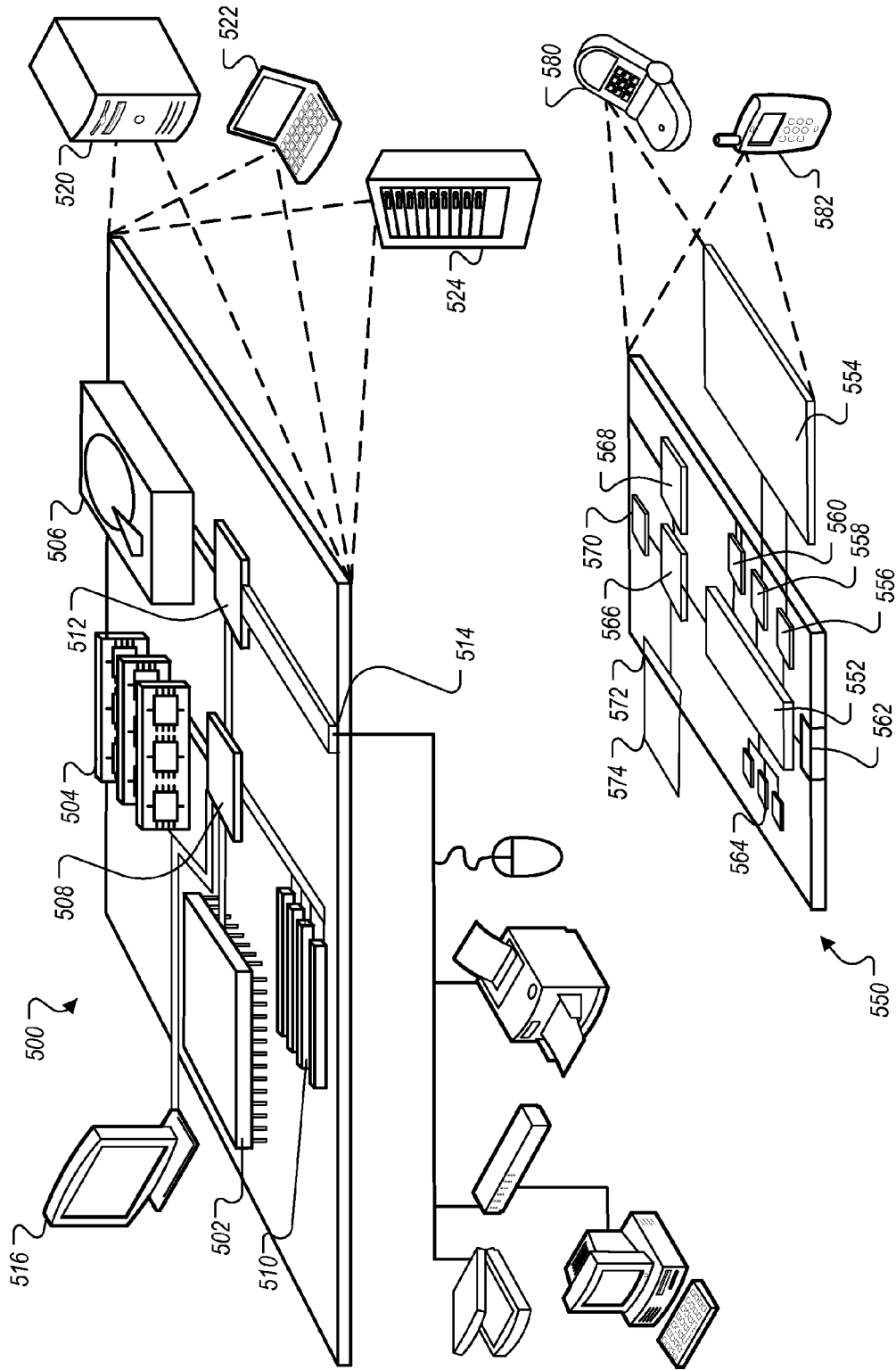
FIG. 5 is a block diagram of an example computer system that can be used to implement the methods, systems and processes described in this disclosure.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Computing device 550 is further intended to represent various typically non-mobile devices, such as televisions or other electronic devices with one or more processors embedded therein or attached thereto. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth™, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication (e.g., via a docking procedure) or for wireless communication (e.g., via Bluetooth™ or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a subscriber identification module (SIM) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth™, Wi-Fi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer that has a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer that has a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and that have a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for displaying content comprising:
   receiving, by one or more processors, content items that are publishable to an activity stream in a social networking application for a user in a social network;
   evaluating, by the one or more processors, the received content items using social criteria, including determining a social quality score for each content item, based at least in part on a measure of a likelihood, upon publishing each content item, of a specific social interaction with the content item and value to the social network of the specific social interaction, including measuring and determining probabilities associated with engagements that users have had with previously-presented content items and that users may have with content items that may be presented in the future;
   filtering, by the one or more processors, the received content items to remove content items having social quality scores below a predetermined threshold;
   ranking, by the one or more processors, remaining content items according to their associated social quality scores; and
   publishing, by the one or more processors, the remaining content items in the activity stream for the user in an order based at least in part on the ranking.

2. The method of claim 1 wherein publishing includes publishing the content items in an activity stream associated with the user.

3. The method of claim 1 wherein evaluating the plurality of content items includes determining a social quality score for each of the content items and ranking the content items using the social quality scores for respective content items.

4. The method of claim 1 wherein evaluating further includes filtering out ones of the plurality of content items based on the social criteria and not publishing the content items that are filtered out.

5. The method of claim 1 wherein the social quality score includes:
   a probability of a social engagement by a user in response to the content item being published; and
   a social value of the social engagement, wherein the social value indicates expected interactions by the user in the social network that result from the published content item; and
   determining the social quality score for each content item is based, at least in part, on a product of the probability of the social engagement and the social value of the social engagement.

6. The method of claim 1 wherein ranking includes promoting the rank of content items in proportion to their associated social quality scores.

7. The method of claim 1 wherein the social engagements are selected from a group comprising: creating an edge in social graph, downloading an app, using an app, downloading a game, playing a game, or engaging with user content.

8. The method of claim 7 wherein engaging with user content is selected from a group comprising: tagging a photo, tagging a video, commenting on content, or republishing content.

9. The method of claim 5 wherein the probability of the social engagement is an expected conversion rate that represents an expected global conversion rate for all users.

10. The method of claim 5 wherein the probability of the social engagement is an expected user conversion rate based on the user's past actions.

11. The method of claim 5 wherein the social value of the social engagement is based on a point system that assigns different points for different types of social engagements.

12. The method of claim 5 wherein the social quality score is a product of the probability of the social engagement and the social value of the social engagement.

13. The method of claim 5 wherein the probability of the social engagement is determined based at least in part on information determined from observed behavior patterns for different users.

14. The method of claim 5 wherein the probability of the social engagement is determined based at least in part on the user's location.

15. The method of claim 5 wherein the probability of the social engagement is determined based at least in part on the user's language.

16. The method of claim 5 wherein the probability of the social engagement is determined from user actions selected from a group comprising: commenting, promoting or messaging.

17. The method of claim 16 wherein the user action of promoting is a social affinity action.

18. The method of claim 1 wherein publishing the remaining content items includes using an auction that determines the order of the remaining content items based at least in part on social quality scores.

19. The method of claim 18 wherein the auction further includes using the display sizes of content items to rank a first content item with a smaller display size over a second content item with a larger display size.

20. The method of claim 1 wherein the received content items include tips to the user.

21. The method of claim 1 wherein the received content items include displayed promotions.

22. The method of claim 21 wherein the displayed promotions are selected from a group comprising: promotions that describe new product features, encouragements to use existing product features, encouragements to download mobile apps, encouragements to visit content elsewhere on a site, or advertisements.

23. The method of claim 1 wherein determining the social quality score includes determining a probability of the user performing an act that constitutes a conversion.

24. The method of claim 23 wherein the probability of the user performing the act is determined using a function that includes a summation of individual probabilities associated with user actions.

25. The method of claim 1 wherein publishing content items in the activity stream is further based on machine learning.

26. The method of claim 25 wherein the machine learning includes processes for stopping publishing of a content item if less than a threshold number of users interact with the content item.

27. The method of claim 25 wherein the machine learning includes determining similarities based on previous actions by the other users and the ranking includes promoting the rank of a content item in proportion to a number of previous similar actions by the other users.

28. A content management system that provides content items, the content management system comprising:
one or more processors; and
one or more memory elements including instructions that, when executed, cause the one or more processors to perform operations associated with:
a social quality score engine that evaluates content items using social criteria, including determining a social quality score for each content item, wherein the content items are publishable to an activity stream in a social networking application for a user in a social network, and wherein the social quality score is based at least in part on a measure of a likelihood, upon publishing each content item, of a specific social interaction with the content item and value to the social network of the specific social interaction, including measuring and determining probabilities associated with engagements that users have had with previously-presented content items and that users may have with content items that may be presented in the future;
a filtering engine that filters content items to remove content items having social quality scores below a predetermined threshold;
a ranking engine that ranks content items according to their associated social quality scores; and
a publishing engine that, in response to a request to publish content items in the activity stream for the user, publishes the remaining content items in the activity stream for the user in an order based at least on the ranking.

29. A computer program product tangibly embodied in a computer-readable storage device and comprising instructions that, when executed by a processor, cause the processor to:
receive content items that are publishable to an activity stream in a social networking application for a user in a social network;
evaluate the received content items using social criteria, including determining a social quality score for each content item, wherein the social quality score is based at least in part on a measure of a likelihood, upon publishing each content item, of a specific social interaction with the content item and value to the social network of the specific social interaction, including measuring and determining probabilities associated with engagements that users have had with previously-presented content items and that users may have with content items that may be presented in the future;
filter the received content items to remove content items having social quality scores below a predetermined threshold;
rank remaining content items according to their associated social quality scores; and
publish the remaining content items in the activity stream for the user in an order based at least in part on the ranking.

* * * * *